United States Patent
Wu et al.

(10) Patent No.: US 10,557,960 B2
(45) Date of Patent: Feb. 11, 2020

(54) WELL RANGING APPARATUS, METHODS, AND SYSTEMS

(71) Applicant: Halliburton Energy Services, Inc., Houston, TX (US)

(72) Inventors: Hsu-Hsiang Wu, Sugar Land, TX (US); Anand Prakash, Tomball, TX (US); Yijing Fan, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 567 days.

(21) Appl. No.: 14/865,659

(22) Filed: Sep. 25, 2015

(65) Prior Publication Data

US 2016/0103240 A1 Apr. 14, 2016

Related U.S. Application Data

(60) Provisional application No. 62/062,333, filed on Oct. 10, 2014.

(51) Int. Cl.
*G01V 3/26* (2006.01)
*G01V 3/08* (2006.01)

(52) U.S. Cl.
CPC ........... *G01V 3/26* (2013.01); *G01V 3/081* (2013.01)

(58) Field of Classification Search
CPC ......... G01V 3/26; G01V 3/081; E21B 47/022
See application file for complete search history.

(56) References Cited

U.S. PATENT DOCUMENTS

| | | | |
|---|---|---|---|
| 4,693,313 A | 9/1987 | Stephenson et al. | |
| 5,343,152 A * | 8/1994 | Kuckes | G01V 3/24 175/45 |
| 5,515,931 A * | 5/1996 | Kuckes | E21B 7/046 175/45 |
| 5,676,212 A * | 10/1997 | Kuckes | E21B 7/04 166/66.5 |
| 5,725,059 A * | 3/1998 | Kuckes | E02D 31/006 175/45 |
| 6,515,592 B1 * | 2/2003 | Babour | G01V 11/002 166/66 |

(Continued)

FOREIGN PATENT DOCUMENTS

WO WO-2014/089402 A2 6/2014

OTHER PUBLICATIONS

"International Application Serial No. PCT/US2015/052271, International Search Report dated Jan. 6, 2016", 3 pgs.

(Continued)

*Primary Examiner* — Alvaro E Fortich
(74) *Attorney, Agent, or Firm* — Gilliam IP PLLC

(57) ABSTRACT

Apparatus, systems, and methods may operate to couple a power supply to a ground point associated with a well, and to a lower portion of a conductive casing disposed within the well, where the lower portion of the conductive casing is separated by an insulating gap from an upper portion of the conductive casing, the upper portion of the conductive casing being at a higher elevation of the first well than the lower portion of the conductive casing. Further activity may include injecting an excitation signal into the lower portion of the conductive casing to induce a magnetic field in a geological formation surrounding the first well. Additional apparatus, systems, and methods are disclosed.

21 Claims, 9 Drawing Sheets

(56) References Cited

U.S. PATENT DOCUMENTS

| | | | |
|---|---|---|---|
| 7,703,548 B2 | 4/2010 | Clark | |
| 8,418,782 B2* | 4/2013 | Waters | E21B 47/02216 |
| | | | 175/45 |
| 2007/0278008 A1 | 12/2007 | Kuckes et al. | |
| 2008/0308271 A1* | 12/2008 | Chouzenoux | E21B 47/01 |
| | | | 166/250.02 |
| 2009/0030615 A1* | 1/2009 | Clark | E21B 47/02216 |
| | | | 702/7 |
| 2009/0038793 A1* | 2/2009 | Schmitt | E21B 47/121 |
| | | | 166/250.01 |
| 2009/0166023 A1* | 7/2009 | Svenning | E21B 47/122 |
| | | | 166/65.1 |
| 2010/0044108 A1 | 2/2010 | Bespalov et al. | |
| 2011/0032117 A1* | 2/2011 | Contant | E21B 17/003 |
| | | | 340/854.4 |
| 2011/0308789 A1* | 12/2011 | Zhang | G01V 3/28 |
| | | | 166/250.01 |
| 2011/0309836 A1* | 12/2011 | Bittar | G01V 3/26 |
| | | | 324/339 |
| 2012/0067644 A1 | 3/2012 | Goswami et al. | |
| 2012/0194195 A1* | 8/2012 | Wisler | E21B 47/02216 |
| | | | 324/346 |
| 2014/0069721 A1 | 3/2014 | Clark et al. | |
| 2014/0190686 A1* | 7/2014 | Cannan | E21B 43/25 |
| | | | 166/250.01 |
| 2015/0027217 A1* | 1/2015 | Kats | G01N 33/383 |
| | | | 73/152.11 |
| 2015/0107349 A1* | 4/2015 | Badri | E21B 49/005 |
| | | | 73/152.04 |
| 2015/0315906 A1* | 11/2015 | Rodney | G01V 3/02 |
| | | | 340/854.4 |

OTHER PUBLICATIONS

"International Application Serial No. PCT/US2015/052271, Written Opinion dated Jan. 6, 2016", 10 pgs.

Australian Application Serial No. 2015328516, Examination Report No. 1, dated Nov. 6, 2017, 3 pgs.

Canadian Application Serial No. 2,960,318, First Office Action, dated Jul. 26, 2017, 6 pgs.

RU Application Serial No. 2017109053, Office Action, dated Nov. 9, 2018, 13 pages, including English translation. Machine Translated.

RU Application Serial No. 2017109053, Office Action, dated Mar. 16, 2018, 13 pages, including English translation. Machine Translated.

RU Application Serial No. 2017109053, Office Action, dated Jun. 28, 2018, 15 pages, including English translation. Machine Translated.

RU Application Serial No. 2017109053, Search Report, dated Mar. 16, 2018, 2 pages.

GCC Application Serial No. 29943; First Examination report, dated Nov. 30, 2018, 6 pages.

India Application Serial No. 201717009301, Office Action, dated Jun. 27, 2019, 7 pages.

Indonesia Application Serial No. P00201701694; Office Action; dated May 17, 2019, 3 pages.

Russia Application Serial No. 2017109053; Decision to Refuse to Grant Patent; dated May 24, 2019, 14 pages including machine translation.

* cited by examiner

US 10,557,960 B2

WELL RANGING APPARATUS, METHODS, AND SYSTEMS

PRIORITY APPLICATION

This application claims the benefit of U.S. Provisional Application Ser. No. 62/062,333, filed on Oct. 10, 2014 which application is incorporated by reference herein in its entirety.

BACKGROUND

The present disclosure relates generally to methods and apparatus that are used as part of ranging techniques, to determine distance and direction between wells in geological formations.

With much of the world's easily obtainable oil having already been produced, new techniques are being developed to extract less accessible hydrocarbons. These techniques often involve drilling a borehole in close proximity to one or more existing wells. Examples of directed drilling near an existing well include well intersection for blowout control, multiple wells drilled from an offshore platform, and closely spaced wells for geothermal energy recovery. Another such technique is steam-assisted gravity drainage (SAGD) that uses a pair of vertically-spaced, horizontal wells constructed along a substantially parallel path, often less than ten meters apart. Careful control of the spacing contributes to the effectiveness of the SAGD technique.

One way to construct a borehole in close proximity to an existing well is "active ranging" in which an electromagnetic source is located in the existing well and monitored via sensors on the drill string in the well under construction. Another technique involves systems that locate both the source and the sensor(s) on the drill string—these are sometimes called "passive ranging" systems by those of ordinary skill in the art. Such ranging techniques are sometimes limited in the degree of accuracy that can be obtained.

DETAILED DESCRIPTION

Figure 1:
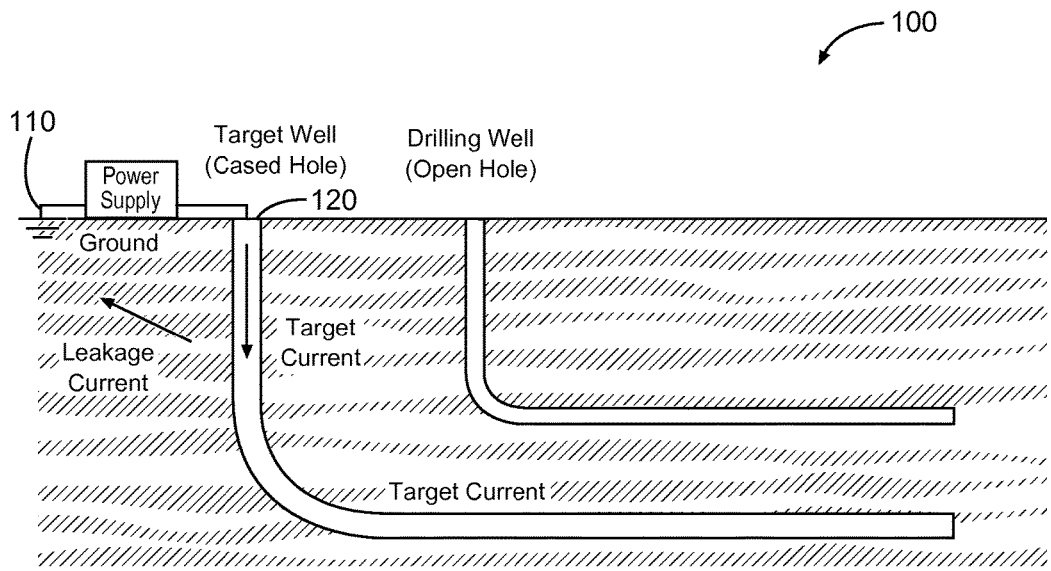
FIG. 1 is a block diagram of a prior art well ranging system.

Magnetic ranging has been widely used for various applications, including well intersection, well avoidance, SAGD, and others. One excitation method for magnetic ranging is surface excitation. Surface excitation is a popular method of generating a ranging signal. It is relatively easy to implement, without the need for complex cables and equipment. When surface excitation is used, a current may be injected into the target well casing at the surface of the well (e.g., at the well head). The current travels along the casing down-hole and generates a magnetic field down-hole that can be measured at a distance (e.g., in a drilling well) for ranging purposes. However, the excitation signal down-hole may be very small when the distance beneath the surface is great, due to current leakage into the formation. Consequently, sensor noise often affects magnetic ranging accuracy at greater depths, leading to false signal measurements and failures in well location.

For example, in ranging applications such as SAGD, excitation current signals are injected via power cables from a power supply at the surface into a target well. An electrical potential difference is created at two positions such that a closed current loop path is enabled to generate current signals. To achieve the potential difference, a voltage may be applied to the target well by connecting the cables to the target well casing, whereas a ground stake is placed at surface. Thus, the closed current loop path is provided via power cables, target well casing, and formations.

Generally speaking, the ground stake should be placed far away from the target well so that most of the injected current stays in the target well casing at deeper depths, owing to less return current from the target well to the ground stake position. The distance to the stake is usually about 200 m to 1000 m, depending on the well depth. On the other hand, it can be challenging to locate the stake at such a large distance, due to rig site conditions. For example, the rig may be located in a forest, with trees and animals nearby. Safety issues may prevent operators from running long distance ground positions. These circumstances may persuade operators to locate the stake much closer to the well, resulting in a relatively short path that increases the amount of leakage current entering the formation, and reduces the amount of injection current and downhole current available for inducing a magnetic ranging signal. Consequently, the ranging signal performance at deeper depths will be poor.

Described herein are mechanisms that can be used to reduce leakage current from the well where the ranging signal is injected. Instead of surface excitation, downhole excitation is proposed, together with insulated gaps that form part of the well casing. These mechanisms can significantly improve the ranging signal strength at deep depth, even when the ground stake position is close to the well head where the injection occurs. Thus, the various embodiments described herein aim to improve down-hole current strength and thus, enhance the available signal/noise ratio, for improved accuracy with respect to ranging measurement technology. The details of various embodiments will now be described.

FIG. 1 is a block diagram of a prior art well ranging system 100, with surface excitation in a SAGD application. Here the power supply is connected to the well head of a target well such that a current loop is enabled via cabling, target well casing, the formation surrounding the casing, ground cabling, and the power supply. Ranging based on surface excitation may fail if an insufficient ranging signal is obtained at depth, due to excessive leakage current. Therefore, to increase the current in the casing at depth by reducing the magnitude of the leakage current, the ground point 110 should be placed far away from the target well head location 120.

Figure 2:
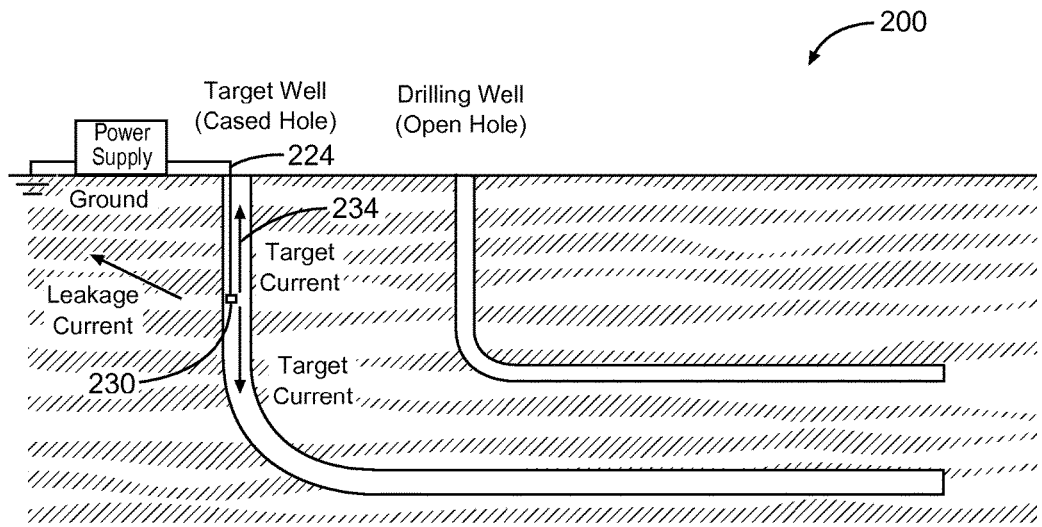
FIG. 2 is a block diagram of another prior art well ranging system.

FIG. 2 is a block diagram of another prior art well ranging system 200, where the target well current at depth is increased using downhole excitation. That is, instead of connecting the power supply cable to the well head, one end of the cable 224 is dropped inside the target well to a selected depth downhole, so that the injection point 230 is below the surface. This enhances the target well current at deeper depths. However, due to some of the injection current 234 flowing back via the well casing to the well head, a significant amount of the injection current available from the power supply is not flowing in the downhole direction at the injection point 230, as compared to surface excitation (see FIG. 1). Indeed, about 30%-60% of the injection current 234 flow back to the well head from the injection point 230, so that the improvement obtained by using this technique is not as significant as might be expected. For example, if one drops the cable end to locate the injection point 230 at 500 m below the surface of the Earth, the depth from which acceptable ranging can be obtained might be expected to increase by 500 m as well. In reality, this technique only increases the effective ranging depth by 200 m-300 m.

Figure 3:
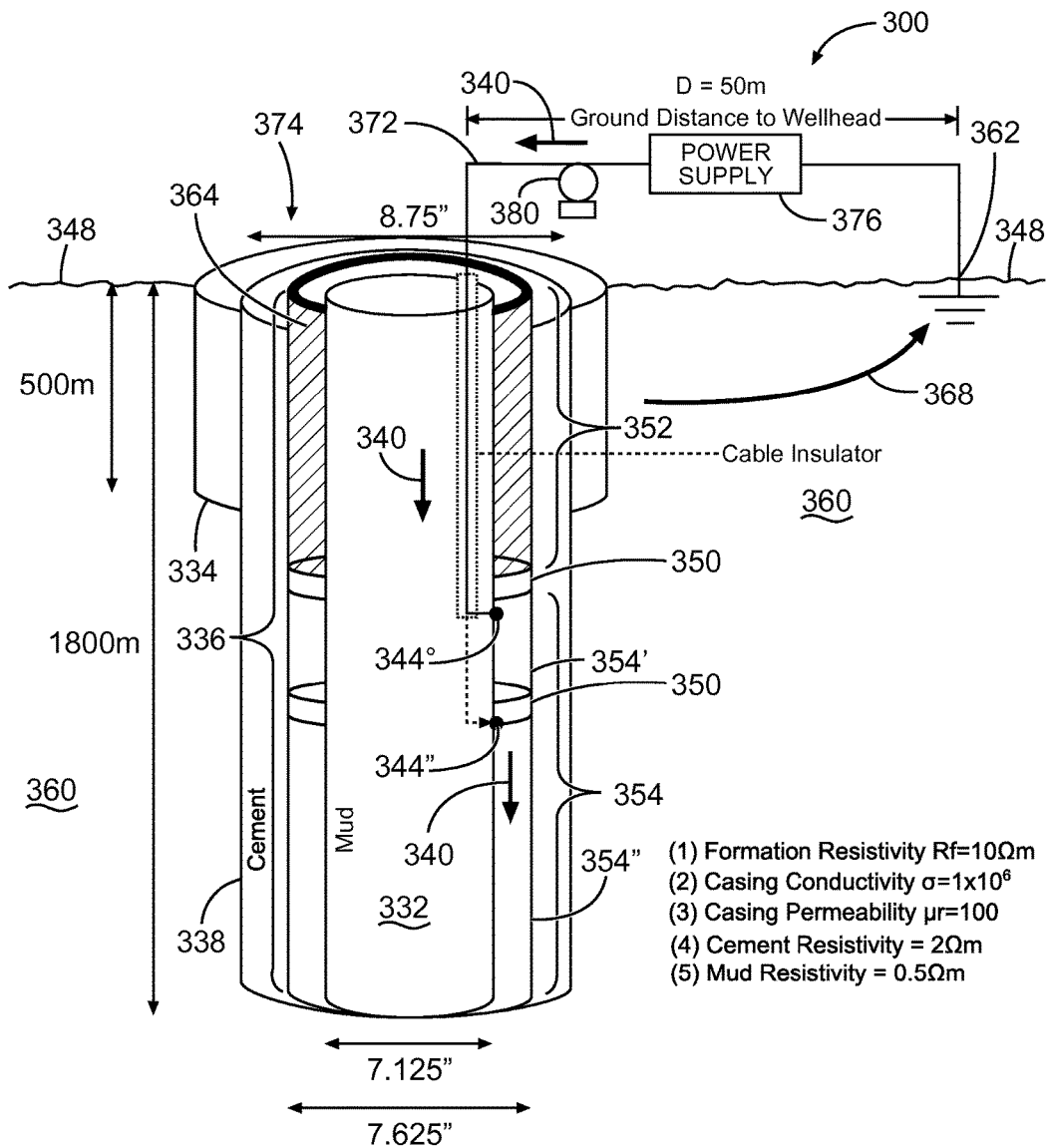
FIG. 3 is a side, cut-away view of an apparatus according to various embodiments of the invention.

FIG. 3 is a side, cut-away view of an apparatus 300 according to various embodiments of the invention. Here the apparatus 300 includes a well 332 that has an outer casing 334 and an inner casing 336, surrounded by cement 338. These elements are arranged to enhance strength of the injected signal 340 at depth. As shown in FIG. 3, the downhole excitation injection terminal 344 is located at 511 m below the surface 348 of the Earth, below an insulated gap 350 in the casing that spans the depth of 510 m to 511 m below the surface 348 of the Earth. Other parameters, such as formation resistivity, mud resistivity, cement resistivity, casing conductivity, and casing permeability are also presented. The values of these parameters represent typical SAGD field conditions.

The casing 336 is divided in the figure into two portions: an upper portion 352, and a lower portion 354, which is at a lower depth than the upper portion 352. The insulated gap 350 is used to minimize leakage current amplitude at the injection terminal 344 into the upper portion 352, improving the amplitude of the current at the injection terminal 344 in the lower portion 354. Although such the gap 350 does not stop leakage current from flowing through the surrounding formation 360s back to the upper portion 352 and the ground point 362 at the surface 348, the gap 350 does operate to significantly improve the strength of the injected signal 340 in the lower portion 354, when compared to the prior art technique shown in FIG. 2.

Thus, an apparatus 300 may comprise two or more portions of casing 336, joined by insulating gap 350 material, with an injection terminal 344 attached to the lowest one of the casing portions. In some embodiments, the apparatus 300 may comprise a first well casing portion (e.g., the upper portion 352) and a second well casing portion (e.g., the lower portion 354) that has an excitation signal injection terminal 344. The second well casing portion may be joined to the first well casing portion by the insulating gap 350 material disposed between the first well casing portion and the second well casing portion.

The insulating gap 350 may comprise a variety of materials. For example, in some embodiments, the insulating gap 350 material comprises a polymer, rubber, or glass. The insulating gap 350 may take the form of a gap sub that attaches the lower portion 354 to the upper portion 352.

One or more of the portions of the casing 336 may be covered, at least in part, by casing insulation material 364. Thus, in some embodiments, at least one of the first well casing portion (e.g., the upper portion 352) or the second well casing portion (e.g., the lower portion 354) comprises a conductive metal at least partially surrounded by casing insulation material 364, to reduce current leakage 368 into a geological formation 360 when current is injected into the second well casing portion via the terminal 344.

The casing insulation material 364 may comprise a variety of materials. For example, in some embodiments, the casing insulation material 364 comprises a polymer, rubber, or glass.

Some modeling studies were performed to compare the strength of the injected down-hole signal 340 along the target well casing using the methods shown in FIGS. 1-3: surface excitation (FIG. 1), downhole excitation (FIG. 2), and downhole excitation with an insulated gap (FIG. 3). Each method was studied using a ground point that was located 50 m away from the target well head. This relatively small amount of separation is useful when rig site conditions do not permit longer distances between the ground stake and the target well head.

Figure 4:
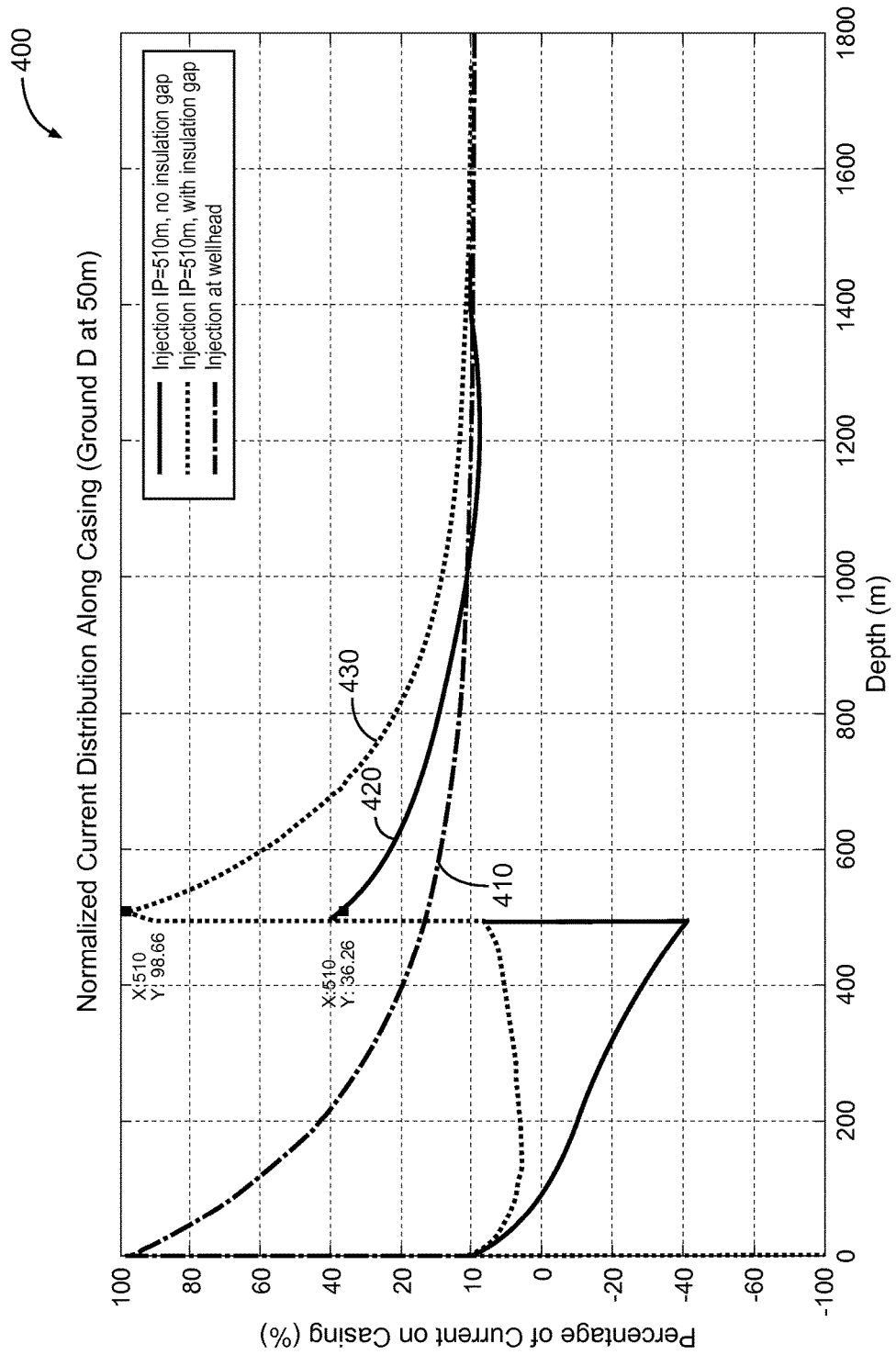
FIG. 4 is a graph of current distribution along a wellbore, according to a linear scale, comparing an embodiment of the invention with the prior art using a nearby ground location.

FIG. 4 is a graph 400 of current distribution along a wellbore, according to a linear scale, comparing an embodiment of the invention with the prior art using a nearby ground location. Here the current distribution is shown along the target well casing at depth, as normalized by cable current from the power supply for three different excitation methods: current injection at the well head 410, current injected downhole 420, and current injected downhole, below an insulating gap in the casing 430.

When injecting current at the wellhead 410, all current will be injected from the power supply cable to the casing at the well head, and thus 100% of the current is shown to be present at a depth of zero meters in the figure. For downhole excitation 420, 100% of the available current is not flowing to portion of the casing below the injection point, since some current (approximately 30%-60% corresponding to different ground positions, formation resistivities, etc.) will flow in the uphole direction—directly along the casing toward the well head. Downhole excitation using an insulated gap 430 significantly improves the current distribution in the lower casing portion. As shown in FIG. 4, around 98% of the injected current can be acquired at the injection point, to flow in the downhole direction.

Figure 5:
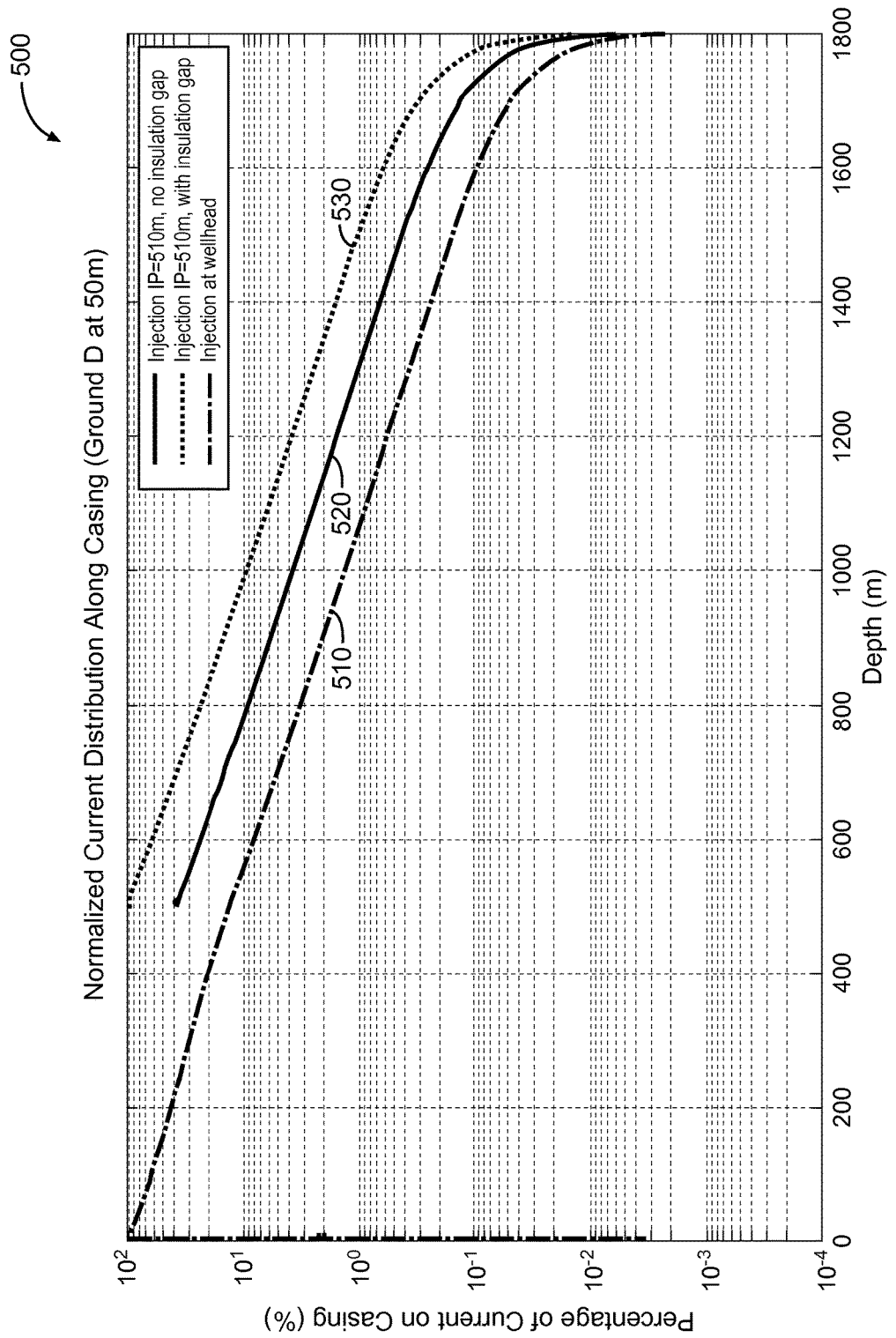
FIG. 5 is a graph of the current distribution along a wellbore shown in FIG. 4, according to a logarithmic scale.

FIG. 5 is a graph 500 of the current distribution along a wellbore shown in FIG. 4, according to a logarithmic scale. This graph 500 provides a logarithmic scale for normalized current distribution, which makes it easier to see that downhole excitation with an insulating gap 530 provides a significantly higher current distribution downhole than injection at the well head 510 or downhole injection 520 by itself, even though the ground point location is same for all three cases.

Considering the same threshold of normalized current percentage in a ranging requirement (e.g., 0.2%), surface excitation 510 may only provide sufficient excitation of electromagnetic waves in the formation to enable ranging applications at depths of up to about 1450 m. Downhole excitation 520 may only provide sufficient excitation of electromagnetic waves in the formation to enable ranging applications at depths of up to about up to depth of about 1650 m. However, downhole excitation in combination with one or more insulating gaps may provide sufficient excitation of electromagnetic waves in the formation to enable ranging applications at depths of up to about 1720 m.

Figure 6:
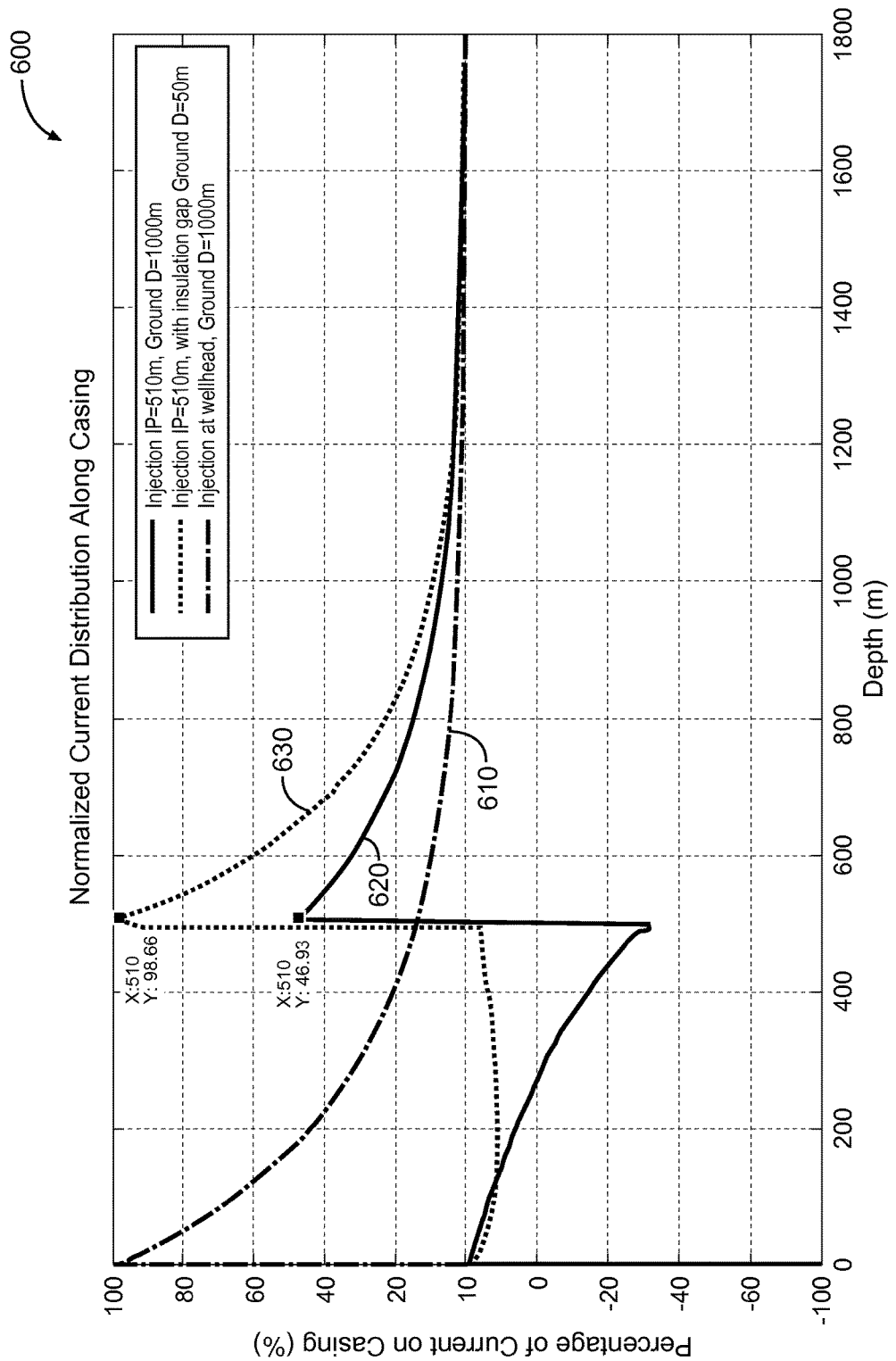
FIG. 6 is a graph of current distribution along a wellbore, according to a linear scale, comparing an embodiment of the invention with the prior art using a distant ground location.

FIG. 6 is a graph 600 of current distribution along a wellbore, according to a linear scale, comparing an embodiment of the invention with the prior art using a distant ground location. This figure details the outcome of another study, where performance of the three different methods described with respect to FIGS. 5-6 are compared when the ground point location for existing methods (e.g., surface excitation 610 and downhole excitation 620 without an insulating gap) is 1000 m away from the target well head, and where the inventive method using downhole excitation with an insulating gap 630 has a ground point location that is only 50 m away from the well head. Previous modeling studies confirm that 1000 m (distant) ground location works well for a typical SAGD application using surface excitation 610. Consequently, this separation distance (D=1000 m) between the ground point location (e.g., the ground stake) and the well head have been used for the existing methods 610, 620, whereas a ground point location that is only 50 m away from the well head (D=50 m) is used for the inventive method 630 to verify a significant improvement in injected current signal strength.

As shown in FIG. 6, at very deep depths (e.g., 1400 m to 1800 m) the downhole excitation method with insulation gap and 50 m ground position (method 630) has very similar performance to the existing methods of injection at the well head 610, and the downhole excitation 620 without an insulation gap—even when a separation from the ground point of 1000 m is used.

Figure 7:
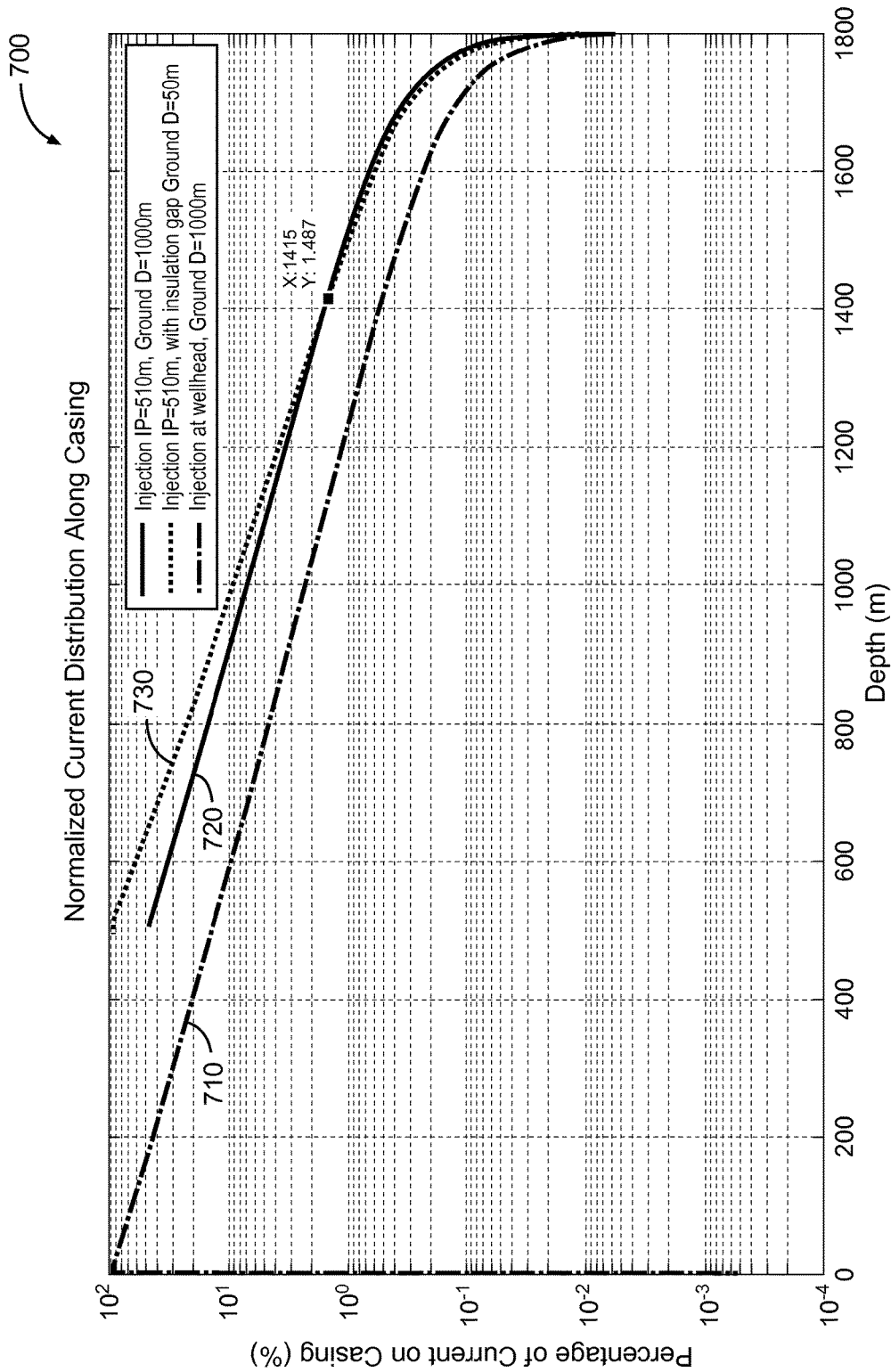
FIG. 7 is a graph of the current distribution along a wellbore shown in FIG. 6, according to a logarithmic scale.

FIG. 7 is a graph 700 of the current distribution along a wellbore shown in FIG. 6, according to a logarithmic scale. Here it can be more clearly seen that the even though the performance of injection downhole, combined with an insulating gap 730 is not quite as good as downhole injection 720 without the gap, this is mainly due to relative proximity of the ground point for the method 730—which in many situations provides an advantage that is worth the slight decrease in performance. And the method of injection downhole in conjunction with an insulating gap 730 performs better than injection at the wellhead, even when the method 710 is favored with a much greater separation between the well head and the ground point.

Thus, it can be clearly understood by those of ordinary skill in the art, after reading this disclosure, that the performance of downhole excitation can be markedly improved by installing an insulating gap above the signal injection point. When this occurs, the vast majority of the injection signal (e.g., current) tends to travel downhole, instead of leaking into the formation, or traveling uphole along the casing. In simple terms, if one or more gaps is located above the injection point, which is lowered from the surface to approximately 500 m in depth, an improvement in injection signal strength equivalent to 450 m (90%) occurs. This improvement in injected signal strength, which in turn improves the strength of the electromagnetic ranging signals generated in the formation thereby, comes with an additional advantage: similar or better performance is obtained when the ground point is relatively close to the well head (e.g., less than 100 m), versus a ground point that is relatively distant from the well head (e.g., about 1000 m).

Figure 8:
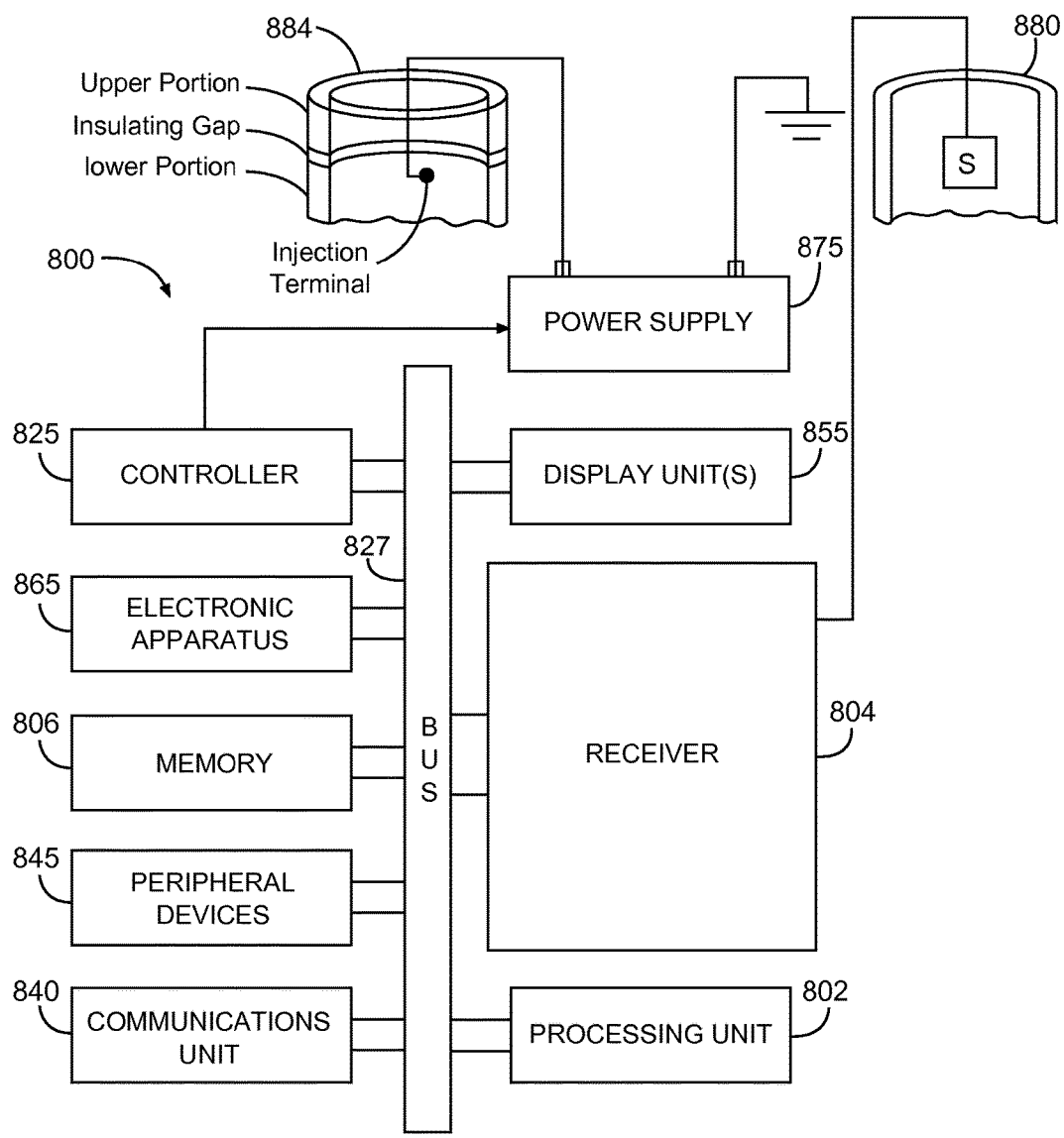
FIG. 8 is a block diagram of a logging system according to various embodiments of the invention.

FIG. 8 is a block diagram of a ranging system 800 according to various embodiments of the invention. Referring now to FIGS. 3 and 8, it can be seen that the ranging system 800 can provide indications of electromagnetic field strength in a formation that surrounds a drilling well 880, resulting from the injection of a signal (e.g., current) into a target well 884. The ranging system 800 includes a receiver 804 operable outside of, or within a wellbore, and coupled to a sensor S.

The processing unit 802 can be programmed to execute control operations and couples to the receiver 804 to obtain measurements from the sensor Sas described earlier herein. In some embodiments, a ranging system 800 comprises one or more of the receiver 804, as well as a housing (not shown in FIG. 8; see FIG. 10) that can house the receiver 804 or other electronics. The housing might take the form of a wireline tool body, or a downhole tool as described in more detail below with reference to FIG. 10. The processing unit 802 may be part of a surface workstation or attached to a downhole tool housing. In some embodiments, the processing unit 802 is packaged within the receiver 804.

The ranging system 800 can include a controller 825, other electronic apparatus 865, and a communications unit 840. The controller 825 and the processing unit 802 can be fabricated to operate the receiver 804 to acquire measurement data, such as electromagnetic signal strength readings.

Electronic apparatus 865 (e.g., electromagnetic sensors, etc.) can be used in conjunction with the controller 825 to perform tasks associated with taking measurements downhole with the receiver 804. The communications unit 840 can include downhole communications in a drilling operation. Such downhole communications can include a telemetry system.

The ranging system 800 can also include a bus 827 to provide common electrical signal paths between the components of the ranging system 800. The bus 827 can include an address bus, a data bus, and a control bus, each independently configured. The bus 827 can also use common conductive lines for providing one or more of address, data, or control, the use of which can be regulated by the controller 825.

The bus 827 can include instrumentality for a communication network. The bus 827 can be configured such that the components of the ranging system 800 are distributed. Such distribution can be arranged between downhole components such as the receiver 804 and components that can be disposed on the surface of a well, such as the power supply 875. Alternatively, several of these components can be co-located, such as on one or more collars of a drill string or on a wireline structure.

In various embodiments, the ranging system 800 includes peripheral devices that can include displays 855, additional storage memory, or other control devices that may operate in conjunction with the controller 825 or the processing unit 802. The display 855 can display diagnostic and range information (e.g., direction and/or distance) for measurements obtained by the receiver 804 based on the injection of signals that induce magnetic fields in a formation according to embodiments described above. The display 855 can also be used to display one or more graphs, similar to what are shown in FIGS. 4-7.

In an embodiment, the controller 825 can be fabricated to include one or more processors. The display 855 can be fabricated or programmed to operate with instructions stored in the processing unit 802 (for example in the memory 806) to implement a user interface to manage the operation of the receiver 804 or components distributed within the ranging system 800. This type of user interface can be operated in conjunction with the communications unit 840 and the bus 827. Various components of the ranging system 800 can be integrated with the receiver 804 or associated housing such that processing identical to or similar to the methods discussed with respect to various embodiments herein can be performed downhole.

In various embodiments, a non-transitory machine-readable storage device (e.g., memory 806) can comprise instructions stored thereon, which, when performed by a machine, cause the machine to become a customized, particular machine (e.g., the processing unit 802) that performs operations comprising one or more features similar to or identical to those described with respect to the methods and techniques described herein. A machine-readable storage device is, herein, a physical device that stores information (e.g., instructions, data), which when stored, alters the physical structure of the device. Examples of machine-readable storage devices can include, but are not limited to, memory 306 in the form of read only memory (ROM), random access memory (RAM), a magnetic disk storage device, an optical storage device, a flash memory, and other electronic, magnetic, or optical memory devices, including combinations thereof.

The physical structure of instructions stored in the memory 806 may be operated on by one or more processors such as, for example, the processing unit 802. Operating on these physical structures can cause the machine to perform operations according to methods described herein. The instructions can include instructions to cause the processing unit 802 to store associated data or other data in the memory 806. The memory 806 can store the results of measurements of formation parameters to include gain parameters, calibration constants, identification data, etc. The memory 806 can store a log of the electromagnetic signal strength data detected by the sensor(s) S. The memory 306 therefore may include a database, for example a relational database. Still further embodiments may be realized.

Figure 9:
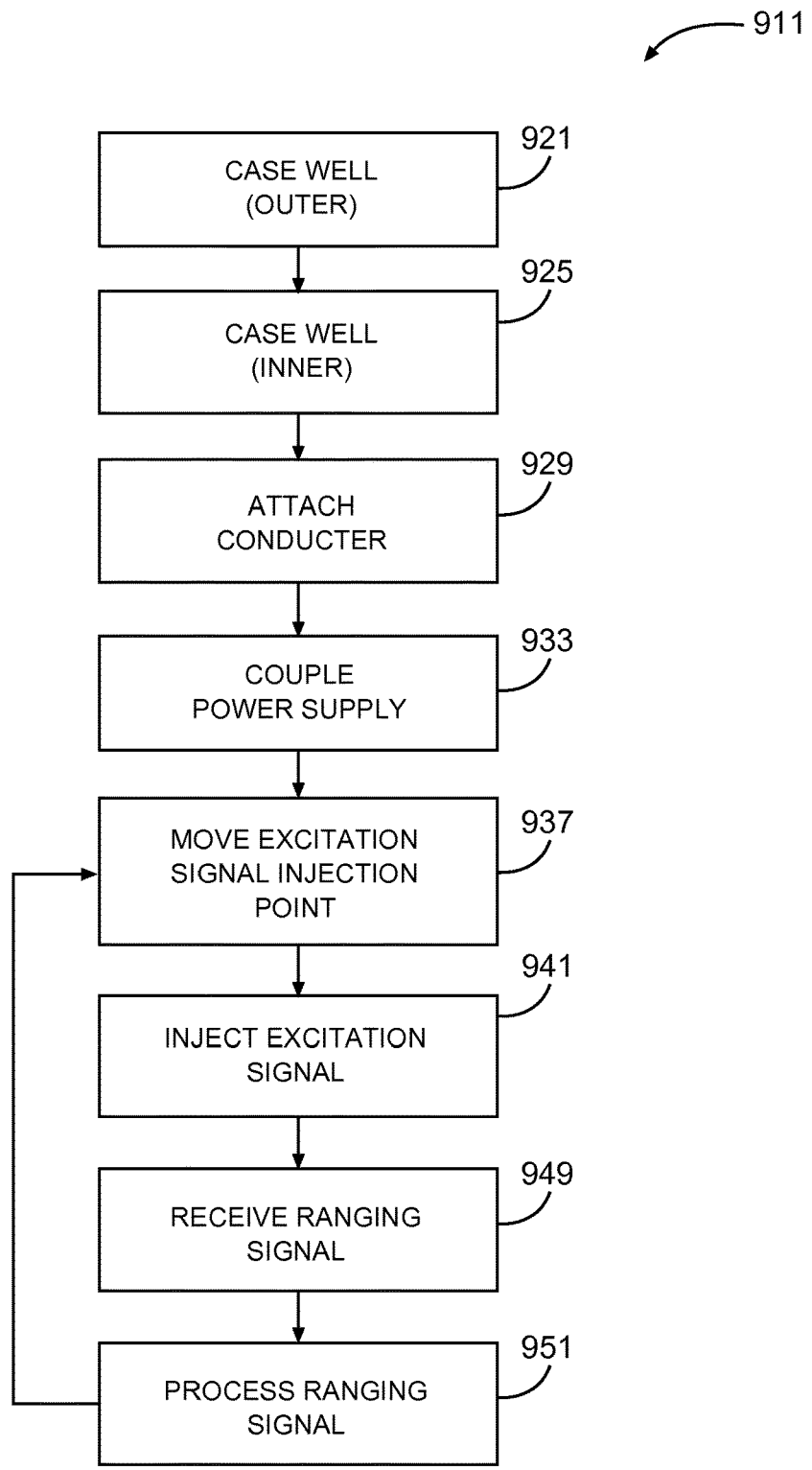
FIG. 9 is a flow diagram illustrating methods of constructing apparatus, according to various embodiments of the invention.

For example, FIG. 9 is a flow diagram illustrating methods 911 of constructing apparatus, according to various embodiments of the invention. In some embodiments, a method 911 comprises installing a casing that has one or more insulating gaps in a well at blocks 921 and 925, and attaching an insulated conductor to one of the lower portions of the casing at block 929 (the lower portion located in a lower region of the well, and being insulated by the gap from one or more casing portions located in an upper region of the well). That is, the injection point that is eventually coupled to the power supply by the insulated conductor is disposed below the gap that exists between casing portions.

For example, a casing with insulating gaps can be effectively installed even when a larger, outer, continuous casing (without insulating gaps) has already been put in place. Thus, in some embodiments, a method 911 includes the activity at block 921, which comprises casing the well with an outer casing that has an inner diameter that is larger than the expected outer diameter of conductive casing, prior to casing the well with the conductive casing.

The method 911 may continue on to comprise casing the well with the conductive casing separated by insulating gaps into at least two portions, wherein the insulating gaps are less than one meter in length, at block 925. Of course, in some embodiments, the method 911 does not include the installation of an outer casing; a single casing is used, and installed at block 925.

The method 911 may continue on to block 929 to comprise attaching an insulated conductor to a lower one of the portions (of the conductive casing) that is separated from an upper one of the portions by at least one of the insulating gaps. Attaching the insulated conductor to the lower one of the portions operates to form an excitation signal injection point that is not directly electrically coupled to the upper one of the portions, wherein the upper one of the portions is at a higher elevation of the well than the lower one of the portions.

In some embodiments, a method 911 comprises coupling a power supply to a ground point and a lower well casing that is separated from an upper well casing by an insulating gap at block 933, and then injecting an excitation signal into the lower casing at block 941. In some embodiments, the activity at block 933 comprises coupling a power supply to a ground point associated with a first well, and to a lower portion of a conductive casing disposed within the first well, the lower portion of the conductive casing separated by an insulating gap from an upper portion of the conductive casing, wherein the upper portion of the conductive casing is at a higher elevation of the first well than the lower portion of the conductive casing; and In most embodiments, good ranging signal reception performance can be achieved even when the ground point for the injection apparatus is relatively close to the well head. Thus, the activity at block 933 may comprise coupling the power supply to a ground point that is less than 100 m from an opening of the first well in a surface of the Earth.

A casing with multiple insulating gaps can be installed, to permit moving the excitation signal injection point from one location downhole, to another. Thus, in some embodiments, the method 911 comprises moving the excitation signal injection point from a first one of the lower one of the portions to a second one of the lower one of the portions at block 937. In some embodiments, the excitation signal injection point is stationary, and not movable.

The method 911 may comprise, at block 941, injecting an excitation signal into the lower portion of the conductive casing to induce a magnetic field in a geological formation surrounding the first well.

The magnetic field arising from the excitation signal can be detected by sensors in a second well (e.g., a drilling well) to determine the range, such as the relative distance and direction, from the second well to the first well. Thus, the method 911 may go on to block 949 to include receiving the ranging signal corresponding to the magnetic field at a sensor disposed in a second well.

Injection and reception can occur in target and drilling wells, respectively. Thus, the first well may be a target well, and the second well may be a drilling well. Conversely, in some embodiments, injection may occur below a gap in a drilling well casing, and reception may occur at the target well. Thus, the first well may be a drilling well and the second well may be a target well.

As noted previously, sensors in the second well can provide signals according to the strength of the magnetic field that has been induced by the injected signal in the first well, and can be used to determine direction/distance. Thus, the method 911 may include, at block 951, processing the ranging signal to determine a distance or direction to the first well, from the second well. In some embodiments, the method 911 includes repeating the activities of blocks 937, 941, 949, and 951 one or more times, in a looped fashion.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those of ordinary skill in the art, such as application program interfaces or inter-process communication techniques, including remote procedure calls. The teachings of various embodiments are not limited to any particular programming language or environment. Thus, other embodiments may be realized.

Figure 10:
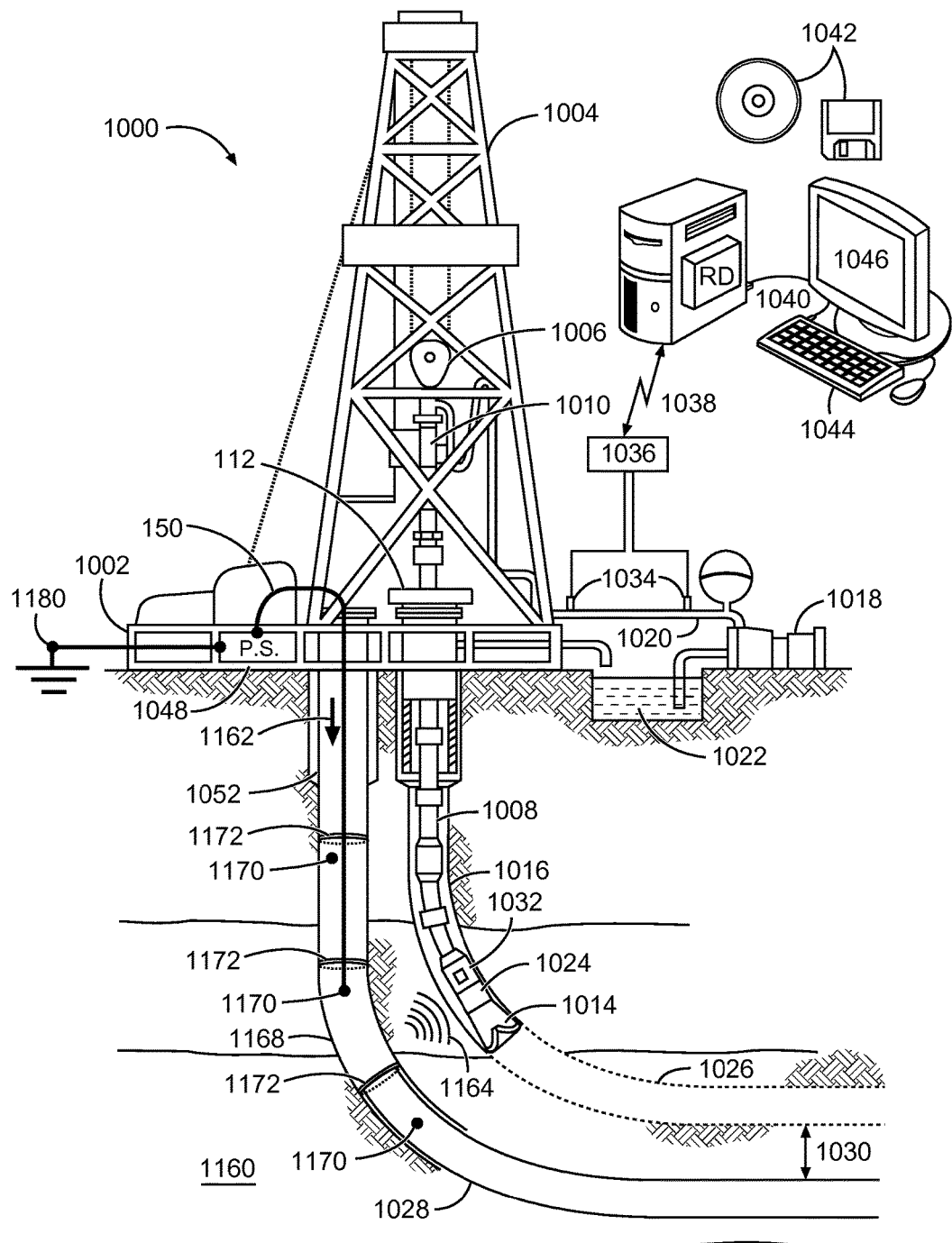
FIG. 10 depicts an example system, according to various embodiments of the invention.

For example, FIG. 10 depicts an example system 1000, according to various embodiments of the invention. This figure is presented to demonstrate that the disclosed apparatus, systems, and methods are best understood in the context of the larger systems in which they operate. Accordingly, FIG. 10 illustrates an example drilling environment in which a drilling platform 1002 supports a derrick 1004 having a traveling block 1006 for raising and lowering a drill string 1008. A top drive 1010 supports and rotates the drill string 1008 as it is lowered through the well-head 1012. A drill bit 1014 is driven by a downhole motor and/or rotation of the drill string 1008. As the drill bit 1014 rotates, it creates a borehole 1016 that passes through various formations. A pump 1018 circulates drilling fluid through a feed pipe 1020 to top drive 1010, downhole through the interior of drill string 1008, through orifices in drill bit 1014, back to the surface via the annulus around drill string 1008, and into a retention pit 1022. The drilling fluid transports cuttings from the borehole 1016 into the retention pit 1022 and aids in maintaining the borehole integrity.

The drill bit 1014 is just one piece of a bottom-hole assembly that includes one or more drill collars (thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (a.k.a. rotational or azimuthal orientation), an inclination angle (the slope), and a compass direction, each of which can be derived from measurements by magnetometers, inclinometers, and/or accelerometers, though other sensor types such as gyroscopes may also be used. In one embodiment, the tool includes a three-axis fluxgate magnetometer and a three-axis accelerometer. As is known in the art, the combination of those two sensor systems enables the measurement of the tool face angle, inclination angle, and compass direction. In some embodiments, the tool face and hole inclination angles are calculated from the accelerometer sensor output. The magnetometer sensor outputs are used to calculate the compass direction.

The bottom-hole assembly further includes a ranging tool 1024 to receive electromagnetic ranging signals 1164 that result from a signal 1162 (e.g., current) injected by a surface power supply 1048 into the casing 1168 (at a terminal point 1170, below an insulating gap 1172). These ranging signals 1164 can be processed to determine distance and direction to the well where the signal 1162 is injected, via the power supply 1048 and the insulated cable 1050.

Using the ranging signal 1164 measurements, in combination with tool orientation measurements, the driller can, for example, steer the drill bit 1014 along a desired path in the drilling well 1026 relative to the existing well (e.g., target well) 1028 in the formation 1160 using any one of various suitable directional drilling systems, including steering vanes, a bent sub, and a rotary steerable system. The steering mechanism can be controlled from the Earth's surface, or downhole, with a downhole controller programmed to follow the existing borehole 1028 at a predetermined distance 1030 and position (e.g., directly above or below the existing borehole, as determined by the strength and direction of the received ranging signals 1164).

A telemetry sub 1032 coupled to the downhole tools (including ranging tool 1024) transmits telemetry data to the surface via mud pulse telemetry. A transmitter in the telemetry sub 1032 modulates a resistance to drilling fluid flow to generate pressure pulses that propagate along the fluid stream at the speed of sound to the surface. One or more pressure transducers 1034 convert the pressure signal into electrical signals for processing by a signal digitizer 1036. Note that other forms of telemetry exist and may be used to communicate signals from downhole to the digitizer. Such telemetry may employ acoustic telemetry, electromagnetic telemetry, or telemetry via wired drill pipe.

The digitizer 1036 supplies a digital form of the telemetry signals via a communications link 1038 to a computer 1040 or some other form of a data processing device. The computer 1040 operates in accordance with software (which may be stored on information storage media 1042) and user input via an input device 1044 to process and decode the received signals. The resulting telemetry data may be further analyzed and processed by the computer 1040 to generate a display of useful information on a computer monitor 1046 or some other form of a display device. For example, a driller could employ this system to obtain and monitor drilling parameters, formation properties, and the path of the borehole relative to the existing borehole 1028 and any detected formation boundaries. A downlink channel can then be used to transmit steering commands from the surface to the bottom-hole assembly.

The power supply 1048 at the surface thus can be coupled to a cable 1050 to inject current 1162 into target well casing 1152 and flowing to down-hole so that magnetic fields that provide ranging signals 1164 can be generated in the formation 1160 surrounding the target well 1028. Then sensors in the ranging tool 1024 in the drilling well 1026 can determine the strength of the magnetic fields that have been induced, so that distance and direction between the target well 1028 and drilling well 1026 can be determined.

The target well 1028 often comprises a cased hole with cement installed around the outside of the casing 1152. In the completion phase of oil and gas wells, the cement serves to isolate the wellbore, prevents casing failure, and keeps the wellbore fluids from contaminating freshwater aquifers. Thus, many embodiments may be realized.

Referring now to FIGS. 3, 8, and 10, it can be seen that one form of an apparatus 300 include a well 332 a well having a conductive casing 336 separated by at least one insulating gap 350 into at least two portions. The apparatus 300 may further include an insulated conductor 372 directly electrically coupled to a lower one of the portions 354 of the casing that is separated from an upper one of the portions 352 of the casing by the at least one insulating gap 350, to form an excitation signal injection point 344 that is not directly electrically coupled to the upper one of the portions 352, wherein the upper one of the portions 352 is at a higher elevation of the well 332 than the lower one of the portions 354. The insulating gap 350 may be approximately 0.1 m in length, but may be larger or smaller. In most embodiments, it is less than 1 m in length.]

The apparatus 300 may include a ground point 362 that is relatively close the well head 374. Thus, the apparatus 300 may comprise a ground point 362 electrically coupled to a surface 348 of the Earth, wherein the ground point 362 is less than 100 m from an opening of the well (e.g., the well head 374) on the surface 348 of the Earth.

A power supply may be coupled to the ground point and (a lower portion of) the casing. Thus, the apparatus 300 may comprise a power supply 376 electrically coupled to the ground point 362 and to the lower one of the portions 354.

An actuator, such as a reel, spool, or some other deployment mechanism (e.g., a wireline tracker), may be used to change the location of the current injection point to some desired position. Thus, in some embodiments, the apparatus 300 comprises an actuator 380 (e.g., perhaps as one of the electronic apparatus 865, or in some embodiments a separate hydraulic or electromechanical apparatus coupled to and controlled by the controller 825) to move the excitation signal injection point 344 from a first one of the lower one of the portions 354', to a second one 354" of the lower one of the portions 354 (e.g., from the first injection terminal 344' to the second injection terminal 344").

A system may include two wells, at least one of which has a casing divided into portions by insulating gaps, along with a signal injection apparatus, and a signal receiver. Thus in some embodiments, a system 1000 comprises a first well 1028 having a conductive casing 1052 separated by at least one insulating gap 1172 into at least two portions 1166, 1168, and an insulated conductor 1050 directly electrically coupled to a lower one of the portions 1168 that is separated from an upper one of the portions 1166 by the at least one insulating gap 1172, to form an excitation signal injection point (e.g., at one of the terminals 1170) that is not directly electrically coupled to the upper one of the portions 1166, wherein the upper one of the portions 1166 is at a higher elevation of the well 1028 than the lower one of the portions 1168.

The system 1000 may further comprise a second well 1026 that includes a signal receiver 804, perhaps forming part of a ranging tool 1024. The system 1000 may include a signal injection apparatus (e.g., a power supply 376, 1048; a cable 372, 1050; and/or a ground point 362, 1180), to inject an excitation signal 340, 1162 directly into the lower one of the portions 1168 to induce a magnetic field into a geological formation 1160 surrounding the lower one of the portions 1168, to provide a ranging signal 1164 corresponding to the magnetic field is to be received by the signal receiver 804.

The signal receiver may take a variety of forms. For example, the receiver 804 may comprise any one or more of a magnetometer, a coil antenna, or a telemetry receiver.

The well that includes the ranging signal receiver may comprise a drilling well, and the other well (where the signal is injected) may have a ground point located relatively closely to its well head. Thus, the second well 1026 may comprise a drilling well, as shown in FIG. 10. In some embodiments, the well locations are reversed with respect to what is shown in FIG. 10, so that signal injection occurs at the drilling well 1026, and ranging signal reception occurs at the target well 1028. The signal injection apparatus may comprise a power supply 1050 coupled to a ground point 1180 that is less than 100 m from an opening of the first well (e.g., the well 1028) in a surface of the Earth. In some embodiments, the excitation signal 1162 comprises a current. In one or more embodiments of the system 1000, and any of the various apparatus described herein, there may be multiple gaps in a conductive well casing, for either a target well or a drilling well, where the casing is separated into multiple portions. The signal injection point may be selectively established at any of the lower portions, including the lowest available portion of the casing.

In summary, using the apparatus, systems, and methods disclosed herein may provide a significant improvement in the signal strength of a signal injected into a well, perhaps as part of an SAGD application, even when the ground point location is relatively close to the well head. The improved injected signal strength, in turn, results in a greater magnitude of the ranging signals arising from the electromagnetic signals induced in the formation. The disclosed mechanism can be implemented at a low cost, to provide a practical alternative to more conventional excitation methods, so that sensors in a drilling well can accurately detect the ranging signal at depth, and thereby determine a relative distance and direction to the target well. These advantages can significantly enhance the value of the services provided by an operation/exploration company, helping to reduce time-related costs. Additional examples are now discussed:

Example 1 is a method, comprising: coupling a power supply to a ground point associated with a first well, and to a lower portion of a conductive casing disposed within the first well, the lower portion of the conductive casing separated by an insulating gap from an upper portion of the conductive casing, wherein the upper portion of the conductive casing is at a higher elevation of the first well than the lower portion of the conductive casing; and injecting an excitation signal into the lower portion of the conductive casing to induce a magnetic field in a geological formation surrounding the first well.

In Example 2, the subject matter of Example 1 may additionally include receiving a ranging signal corresponding to the magnetic field at a sensor disposed in a second well.

In Example 3, the subject matter of Examples 1-2 may additionally include processing the ranging signal to determine a distance or direction to the first well, from the second well.

In Example 4, the subject matter of Examples 1-3 may additionally include wherein the first well is a target well and the second well is a drilling well.

In Example 5, the subject matter of Examples 1-4 may additionally include, wherein the first well is a drilling well and the second well is a target well.

In Example 6, the subject matter of Examples 1-5 may additionally include wherein the coupling comprises coupling the power supply to a ground point that is less than 100 m from an opening of the first well in a surface of the Earth.

Example 7 is a method, comprising: casing a well with a conductive casing separated by insulating gaps into at least two portions; and attaching an insulated conductor to a lower one of the portions that is separated from an upper one of the portions by at least one of the insulating gaps, to form an excitation signal injection point that is not directly electrically coupled to the upper one of the portions, wherein the upper one of the portions is at a higher elevation of the well than the lower one of the portions.

In Example 8, the subject matter of Example 7 may additionally include prior to casing the well with the conductive casing, casing the well with an outer casing that has an inner diameter that is larger than the outer diameter of the conductive casing.

In Example 9, the subject matter of Examples 7-8 may additionally include moving the excitation signal injection point from a first one of the lower one of the portions to a second one of the lower one of the portions.

Example 10 is an apparatus, comprising: a well having a conductive casing separated by at least one insulating gap into at least two portions; and an insulated conductor directly electrically coupled to a lower one of the portions that is separated from an upper one of the portions by the at least one insulating gap, to form an excitation signal injection point that is not directly electrically coupled to the upper one of the portions, wherein the upper one of the portions is at a higher elevation of the well than the lower one of the portions.

In Example 11, the subject matter of Example 10 may additionally include wherein the at least one insulating gap is less than one meter in length.

In Example 12, the subject matter of Examples 10-11 may additionally include a ground point electrically coupled to a surface of the Earth, wherein the ground point is less than 100 m from an opening of the well on the surface of the Earth.

In Example 13, the subject matter of Examples 10-12 may additionally include a power supply electrically coupled to the ground point and to the lower one of the portions.

In Example 14, the subject matter of Examples 10-13 may additionally include an actuator to move the excitation signal injection point from a first one of the lower one of the portions, to a second one of the lower one of the portions.

Example 15 is an apparatus, comprising: an upper well casing portion; and a lower well casing portion having an excitation signal injection terminal, wherein the lower well casing portion is joined to the upper well casing portion by insulating gap material disposed between the upper well casing portion and the lower well casing portion.

In Example 16, the subject matter of Example 15 may additionally include wherein the insulating gap material comprises a polymer, rubber, or glass.

In Example 17, the subject matter of Examples 15-16 may additionally include wherein at least one of the upper well casing portion or the lower well casing portion comprises a conductive metal at least partially surrounded by casing insulation material, to reduce current leakage into a geological formation when current is injected into the lower well casing portion via the terminal.

In Example 18, the subject matter of Examples 15-17 may additionally include wherein the casing insulation material comprises a polymer, rubber, or glass.

Example 19 is a system, comprising: a first well having a conductive casing separated by at least one insulating gap into at least two portions, and an insulated conductor directly electrically coupled to a lower one of the portions that is separated from an upper one of the portions by the at least one insulating gap, to form an excitation signal injection point that is not directly electrically coupled to the upper one of the portions, wherein the upper one of the portions is at a higher elevation of the well than the lower one of the portions; a second well including a signal receiver; and a signal injection apparatus, to inject an excitation signal directly into the lower one of the portions to induce a magnetic field into a geological formation surrounding the lower one of the portions, wherein a ranging signal corresponding to the magnetic field is to be received by the signal receiver.

In Example 20, the subject matter of Example 19 may additionally include wherein the signal receiver comprises a magnetometer, a coil antenna, or a telemetry receiver.

In Example 21, the subject matter of Examples 19-20 may additionally include wherein the second well comprises a drilling well, wherein the signal injection apparatus comprises a power supply coupled to a ground point that is less than 100 m from an opening of the first well in a surface of the Earth, and wherein the excitation signal comprises a current.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method comprising:
coupling a power supply to a ground point at a surface of the Earth that is less than 200 meters from an opening of a first well at the surface of the Earth, and to a lower portion of a conductive casing disposed within the first well, the lower portion of the conductive casing separated by an insulating gap from an upper portion of the conductive casing, wherein the upper portion of the conductive casing is at a higher elevation of the first well than the lower portion of the conductive casing, wherein a ratio of a distance of the ground point to the opening of the first well at the surface of the Earth to a distance from the surface of the Earth to an injection point is less than 0.05; and
injecting an excitation signal into the lower portion of the conductive casing to induce a magnetic field in a geological formation surrounding the first well.

2. The method of claim 1, further comprising:
receiving a ranging signal corresponding to the magnetic field at a sensor disposed in a second well.

3. The method of claim 2, further comprising:
processing the ranging signal to determine a distance or direction to the first well, from the second well.

4. The method of claim 2, wherein the first well is a target well and the second well is a drilling well.

5. The method of claim 2, wherein the first well is a drilling well and the second well is a target well.

6. A method comprising:
casing a well with a conductive casing separated by insulating gaps into at least two portions;
attaching an insulated conductor to a lower one of the at least two portions that is separated from an upper one of the at least two portions by at least one of the insulating gaps, to form an excitation signal injection point in the lower one of the at least two portions that is not directly electrically coupled to the upper one of the at least two portions, wherein the upper one of the at least two portions is at a higher elevation of the well than the lower one of the at least two portions;
coupling a power supply to a ground point at a surface of the Earth and to the excitation signal injection point, wherein the ground point is less than 200 meters from an opening of the well at the surface of the Earth, wherein a ratio of a distance of the ground point to the opening of the well at the surface of the Earth to a distance from the surface of the Earth to the excitation signal injection point is less than 0.05; and
injecting an excitation signal into the lower portion of the conductive casing to induce a magnetic field in a geological formation surrounding the well.

7. The method of claim 6, further comprising:
prior to casing the well with the conductive casing, casing the well with an outer casing that has an inner diameter that is larger than the outer diameter of the conductive casing.

8. The method of claim 6, further comprising:
moving the excitation signal injection point from a first one of the lower one of the at least two portions to a second one of the lower one of the at least two portions.

9. An apparatus comprising:
a well having a conductive casing separated by at least one insulating gap into at least two portions;
an insulated conductor directly electrically coupled to a power supply and to a lower one of the at least two portions that is separated from an upper one of the at least two portions by the at least one insulating gap, to form an excitation signal injection point that is not directly electrically coupled to the upper one of the at least two portions, wherein the upper one of the at least two portions is at a higher elevation of the well than the lower one of the at least two portions; and
a ground point electrically coupled to a surface of the Earth and to the power supply, wherein the ground point is less than 200 meters from the opening of the well at the surface of the Earth, wherein a ratio of a distance of the around point to the opening of the well at the surface of the Earth to a distance from the surface of the Earth to the excitation signal injection point is less than 0.05.

10. The apparatus of claim 9, wherein the at least one insulating gap is less than one meter in length.

11. The apparatus of claim 9, further comprising:
an actuator to move the excitation signal injection point from a first one of the lower one of the at least two portions, to a second one of the lower one of the at least two portions.

12. An apparatus comprising:
an upper well casing portion disposed in a well;
a lower well casing portion disposed in the well and having an excitation signal injection terminal, wherein the lower well casing portion is joined to the upper well casing portion by insulating gap material disposed between the upper well casing portion and the lower well casing portion; and
a power supply electrically coupled to a ground point at a surface of the Earth and the excitation signal injection terminal, wherein the excitation signal injection terminal is to inject, based on power supplied by the power supply, an excitation signal into the lower well casing portion to induce a magnetic field in a surrounding geological formation, and wherein the ground point is less than 200 meters from an opening of the well at the surface of the Earth, wherein a ratio of a distance of the around point to the opening of the well at the surface of the Earth to a distance from the surface of the Earth to an injection point is less than 0.05.

13. The apparatus of claim 12, wherein the insulating gap material comprises a polymer, rubber, or glass.

14. The apparatus of claim 12, wherein at least one of the upper well casing portion or the lower well casing portion comprises a conductive metal at least partially surrounded by casing insulation material, to reduce current leakage into the surrounding geological formation when current is injected into the lower well casing portion via the excitation signal injection terminal.

15. The apparatus of claim 14, wherein the casing insulation material comprises a polymer, rubber, or glass.

16. A system comprising:
a first well having a conductive casing separated by at least one insulating gap into at least two portions, and an insulated conductor directly electrically coupled to a lower one of the at least two portions that is separated from an upper one of the at least two portions by the at least one insulating gap, to form an excitation signal injection point that is not directly electrically coupled to the upper one of the at least two portions, wherein the upper one of the at least two portions is at a higher elevation of the first well than the lower one of the at least two portions;
a second well including a signal receiver; and
a signal injection apparatus, to inject an excitation signal directly into the lower one of the at least two portions to induce a magnetic field into a geological formation surrounding the lower one of the at least two portions, wherein a ranging signal corresponding to the magnetic field is to be received by the signal receiver, wherein the signal injection apparatus comprises a power supply coupled to a ground point that is less than 200 meters from an opening of the first well, at the surface of the Earth, wherein a ratio of a distance of the around point to the opening of the first well at the surface of the Earth to a distance from the surface of the Earth to the excitation signal injection point is less than 0.05 and wherein the excitation signal comprises a current.

17. The system of claim 16, wherein the signal receiver comprises a magnetometer, a coil antenna, or a telemetry receiver.

18. The system of claim 16, wherein the second well comprises a drilling well.

19. The method of claim 6, wherein the ground point is at most 50 meters from the opening of the well on the surface of the Earth.

20. The apparatus of claim 12, wherein the ground point is at most 50 meters from the opening of the well on the surface of the Earth.

21. The system of claim 16,
wherein the signal injection apparatus is to inject the excitation signal at the excitation signal injection point in the lower one of the at least two portions, and
wherein the signal injection apparatus comprises the power supply coupled to the ground point at the surface of the Earth and the excitation signal injection point.

\* \* \* \* \*